US011537735B2

(12) United States Patent
Todd et al.

(10) Patent No.: US 11,537,735 B2
(45) Date of Patent: Dec. 27, 2022

(54) TRUSTED ENTERPRISE DATA ASSETS VIA DATA CONFIDENCE FABRICS (71) Applicant: EMC IP Holding Company LLC, Hopkinton, MA (US)

(72) Inventors: Stephen J. Todd, North Andover, MA (US); Nicole Reineke, Northborough, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 274 days.

(21) Appl. No.: 17/038,849

(22) Filed: Sep. 30, 2020

(65) Prior Publication Data

US 2022/0100879 A1 Mar. 31, 2022

(51) Int. Cl.
*G06F 7/04* (2006.01)
*G06F 21/62* (2013.01)
*G06F 16/23* (2019.01)
*H04N 7/16* (2011.01)

(52) U.S. Cl.
CPC ...... *G06F 21/6218* (2013.01); *G06F 16/2379* (2019.01)

(58) Field of Classification Search
CPC .................. G06F 16/2379; G06F 21/6218
See application file for complete search history.

(56) References Cited

U.S. PATENT DOCUMENTS

| | | | |
|---|---|---|---|
| 9,680,873 B1* | 6/2017 | Halls | H04L 63/20 |
| 9,858,424 B1* | 1/2018 | Grafi | G06F 21/316 |
| 10,812,326 B1* | 10/2020 | Todd | H04L 67/34 |
| 11,108,891 B1* | 8/2021 | Todd | H04L 41/22 |
| 11,146,560 B1* | 10/2021 | Nene | G06F 16/2365 |
| 11,388,147 B2* | 7/2022 | Todd | H04L 9/50 |
| 11,416,230 B2* | 8/2022 | Todd | G06F 8/60 |
| 2016/0294954 A1* | 10/2016 | Khayrudinov | G06Q 10/10 |
| 2018/0324154 A1* | 11/2018 | Crabtree | H04L 63/1408 |
| 2019/0122258 A1* | 4/2019 | Bramberger | G06Q 30/0248 |
| 2020/0021546 A1* | 1/2020 | Cardinal | H04L 51/214 |
| 2020/0042721 A1* | 2/2020 | Castinado | G06F 21/6218 |
| 2020/0142883 A1* | 5/2020 | Thapar | G06F 21/645 |
| 2020/0159890 A1* | 5/2020 | Chui | G06F 21/105 |
| 2020/0167770 A1* | 5/2020 | Kurian | H04L 9/3247 |
| 2020/0394322 A1* | 12/2020 | Ramos | G06F 16/93 |
| 2021/0006410 A1* | 1/2021 | Uhr | H04L 9/3247 |
| 2021/0034382 A1* | 2/2021 | Todd | H04L 9/3247 |
| 2021/0034435 A1* | 2/2021 | Todd | G06F 11/3433 |
| 2021/0036866 A1* | 2/2021 | Zolfonoon | H04L 67/34 |
| 2021/0037056 A1* | 2/2021 | Todd | H04L 9/50 |
| 2021/0117128 A1* | 4/2021 | Todd | G06F 3/067 |
| 2021/0124727 A1* | 4/2021 | Todd | G06F 16/2237 |
| 2021/0124728 A1* | 4/2021 | Todd | G06F 16/2365 |

(Continued)

*Primary Examiner* — Gary S Gracia (74) *Attorney, Agent, or Firm* — Workman Nydegger (57) ABSTRACT One example method includes checking an asset against an Inclusion List and/or an Exclusion List to determine if the asset is permitted to contribute data, generated by the asset, to an enterprise data confidence fabric, when the asset is present on the Inclusion List, or not present on the Exclusion List, designating the asset as a trusted asset and appending the data generated by the asset to a ledger of the enterprise data confidence fabric, updating a ledger content index to reflect the data that was appended to the ledger, and annotating the data generated by the asset with trust metadata.

20 Claims, 5 Drawing Sheets (56) References Cited

U.S. PATENT DOCUMENTS

| | | | | |
|---|---|---|---|---|
| 2021/0124817 A1* | 4/2021 | Todd | ................. | G06F 21/64 |
| 2021/0126935 A1* | 4/2021 | Todd | ................. | H04L 63/1416 |
| 2021/0243167 A1* | 8/2021 | Todd | ................. | H04L 9/50 |
| 2021/0243218 A1* | 8/2021 | Todd | ................. | H04L 63/12 |
| 2021/0248514 A1* | 8/2021 | Celia | ................. | G06Q 30/0278 |
| 2021/0304065 A1* | 9/2021 | Todd | ................. | G06N 5/02 |
| 2021/0306819 A1* | 9/2021 | Todd | ................. | G16Y 30/10 |
| 2021/0374214 A1* | 12/2021 | Wright | ................. | H04L 9/0643 |
| 2021/0374264 A1* | 12/2021 | Todd | ................. | G06F 8/63 |
| 2021/0374730 A1* | 12/2021 | Todd | ................. | H04L 9/50 |
| 2021/0405983 A1* | 12/2021 | Todd | ................. | G06F 8/60 |
| 2021/0406248 A1* | 12/2021 | Todd | ................. | G06F 16/2379 |
| 2021/0409436 A1* | 12/2021 | Todd | ................. | H04L 63/1408 |
| 2022/0043711 A1* | 2/2022 | Shemer | ................. | G06F 11/1415 |
| 2022/0043721 A1* | 2/2022 | Shemer | ................. | G06F 11/1464 |
| 2022/0100858 A1* | 3/2022 | Todd | ................. | G06F 16/1824 |
| 2022/0100879 A1* | 3/2022 | Todd | ................. | G06F 16/2379 |
| 2022/0101336 A1* | 3/2022 | Todd | ................. | G06Q 30/018 |
| 2022/0129555 A1* | 4/2022 | Todd | ................. | G06F 21/57 |
| 2022/0138325 A1* | 5/2022 | Todd | ................. | G06F 21/54 726/26 |
| 2022/0207386 A1* | 6/2022 | Todd | ................. | G06N 5/04 |

* cited by examiner

TRUSTED ENTERPRISE DATA ASSETS VIA DATA CONFIDENCE FABRICS

FIELD OF THE INVENTION

Embodiments of the present invention generally relate to data confidence fabrics. More particularly, at least some embodiments of the invention relate to systems, hardware, software, computer-readable media, and methods for the implementation of data confidence fabrics and associated functionality in enterprise contexts.

BACKGROUND

A Data Confidence Fabric (DCF) annotates and scores data that flows within it. A DCF enables an application or user to measure data trustworthiness and thus acquire a level of confidence as it is processed by analytic frameworks and managed by data governance tools. While DCFs have sometimes been employed in edge contexts, a need remains for DCF functionality in enterprise contexts. However, and by way of example, usage patterns and transit of data in an enterprise are typically different than in an edge context. For these reasons, at least, implementation of DCFs in an enterprise setting is neither straightforward or trivial.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data confidence fabrics. More particularly, at least some embodiments of the invention relate to systems, hardware, software, computer-readable media, and methods for the implementation of data confidence fabrics and associated functionality in enterprise contexts.

In general, example embodiments of the invention concern the implementation of a DCF in an enterprise setting or context. In one example embodiment, an enterprise DCF may be implemented in part, or in whole, within a corporate firewall, although it is not necessarily required that any part of the enterprise DCF be implemented within a firewall. The enterprise DCF may include various enterprise computing systems, software, and devices, as DCF nodes. The DCF nodes may include, for example, data generators such as applications and client machines, data holders such as databases, storage devices, and memory devices, BYOD (bring your own device) devices which may include portable devices such as laptops and smartphones for example, and trusted external devices that may, or may not, be affiliated with the enterprise. Some of the elements of the DCF may be relatively more trustworthy, for example in terms of their handling of data, than other elements of the DCF. Elements of the enterprise DCF may, in turn, communicate with one or more edge devices.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that mechanisms may be provided for adding, or including, trusted devices to an enterprise DCF. In an embodiment, a mechanism may be provided for exclusion of certain devices that are untrusted. In an embodiment, DCF 'join' capabilities may be enabled and installed on a trusted device so that the device is able to join the enterprise DCF. In an embodiment, provision may be made for registration of new/modified device data/metadata with the enterprise DCF. An embodiment may enable DCF updates of only specified, or non-specified, file types. In an embodiment, DCF registration functionality may be built in to an application. In an embodiment, provision may be made for ledger registration, concerning DCF metadata associated with backup data, from a backup service. As a final example, an embodiment may include an indexing service on the DCF that may enable the definition of rules that may be used to locate specific information or data of the DCF.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations relating to a data confidence fabric. Such operations may be performed, for example, on-premises at an enterprise, and/or in cloud storage environments and/or cloud computing environments.

Example cloud environments, which may or may not be public, include cloud storage environments that may provide data protection functionality for one or more clients. Another example of a cloud environment is one in which processing, data protection, and other, services may be performed on behalf of one or more clients. Some example cloud environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. OVERVIEW

Figure 1:
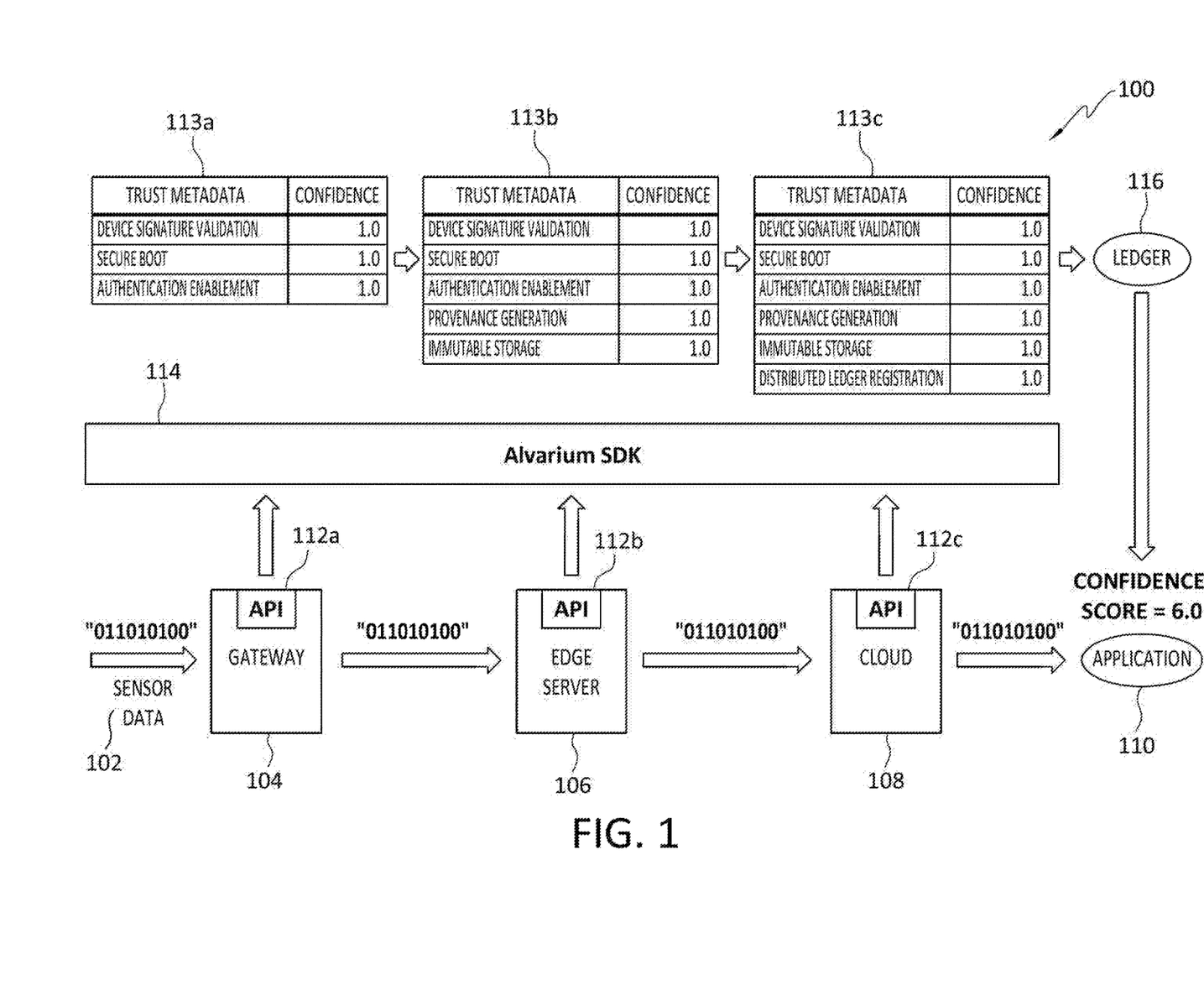
FIG. 1 discloses aspects of examples of annotation and scoring of IoT edge device data.

As noted, example embodiments may be employed in connection with a data confidence fabric (DCF). In general, an embodiment of a data confidence fabric may, among other things, annotate and score any data that flows within it, providing increased confidence to the applications that analyze and/or otherwise employ that data. FIG. 1 discloses an implementation of a DCF 100 in the context of an edge-based use case.

More particularly, FIG. 1 discloses data 102 flowing through various tiers or levels of the DCF 100, such as a gateway 104, edge server 106, and cloud ecosystem 108, towards an application 110 that may need to access and use the data 102. The data 102 may be generated by systems, devices, and/or software.

Data generating devices 102 may take the form, for example, of IoT (Internet of Things) devices such as, but not limited to, mobile phones, autonomous vehicles such as drones, computing devices such as laptops, sensors operable to detect and report on atmospheric conditions within a particular volume, such as a volume defined by a building, and sensors operable to detect and report on the status and operation of computing systems, software, and devices.

Note that as used herein, a 'sensor' is broad in scope and may embrace, but is not limited to, any device, system, and/or software, operable to detect environmental parameters including, but not limited to, light, heat, moisture, temperature, pressure, humidity, smoke, gases, sound, vibration, motion. Thus, such environmental parameters include physical parameters of a physical environment, such as a datacenter building for example, in which a computing system, device, and/or software may operate. The term 'sensor' also may embrace, but is not limited to, any device, system, and/or software, operable to detect operational parameters of any type of computing device, system, or component, where such operational parameters may include, but are not limited to, bandwidth, throughput rate, disk operation, disk RPMs, and bit error rate.

With continued reference to FIG. 1, as trusted handling of the data 102, at the various levels of the DCF 100, occurs during delivery, annotations and scores may associated with the data stream by each tier system/device via a respective API 112*a*, 112*b*, and 112*c* of those levels. Each of the APIs 112*a*, 112*b*, and 112*c*, may communicate and append respective metadata from the corresponding tier system/device to trust metadata 113*a*, 113*b*, and 113*c*, which may be contained in a table or other structure. The metadata appended to the data 102 by the systems, devices and/or software at each level of the DCF 100 may be appended by way of a framework 114, such as Alvarium SDK. That is, as the data 102 passes through the various levels of the DCF 100, each of the levels, such as the gateway 104, edge server 106, and cloud ecosystem 108, may append, or otherwise associate, respective trust metadata to the data 102.

In the particular example of FIG. 1, the gateway 104 has annotated three operations with respect to the data 102, as indicated by the trust metadata 113*a*. Particularly, the gateway 104 has successfully validated the signature coming from the device that generated the data 102. As well, the gateway 104 has used a TPM chip to confirm that the BIOS, firmware, or 0/S on the gateway 104 had not been tampered with during boot. Finally, the gateway 104 may be running authentication/authorization software to protect the data stream from unwanted inspection or access. In the example of FIG. 1, a score of "1.0" means that the operation has succeeded, while a score of "0," for example, might indicate that signature validation failed.

The DCF metadata, such as the trust metadata 113a, 113b, and 113c, may ultimately arrive at a ledger 116, where a ledger entry may be created that permanently records the contents of the table, that is, the table that includes the trust metadata 113c, as well as an overall "confidence score," a "6.0" in this case, which may be a sum of all the confidence scores in the table that includes the trust metadata 113c. While the confidence scores were summed in this case, other operations or equations may be used to generate a confidence score.

One useful aspect provide by the example DCF 100 is that the application 110 may now have additional context about the trustworthiness of the data 102 and, as such, may be equipped to address the problem of potentially untrustworthy, or malicious, edge data sources. The problem of questionable data from data sources is increasingly faced by enterprise customers as they move their business logic closer to non-enterprise, and potentially untrustworthy, data sources. Thus, these and other benefits of a DCF, such as the DCF 100, may find applicability in an enterprise context as well. However, because considerations such as the usage patterns and transit of data may be different in an enterprise context than they are in an edge computing context, there are non-trivial problems that may have to be overcome when considering the implementation of a DCF in an enterprise setting. Some examples of these challenges are discussed below in connection with FIG. 2.

By way of background, businesses may use their data as a competitive advantage. Corporate data may be used, for example, to reduce operational costs, increase revenue, change behavior, and even predict behavior. Thus, it may be important for organizations to have full access to all data content, at least data content concerning business priorities, on a continual basis, to understand the relative context of the data, and to have immutable proof that the data being used for critical decision making is not externally manipulated.

Figure 2:
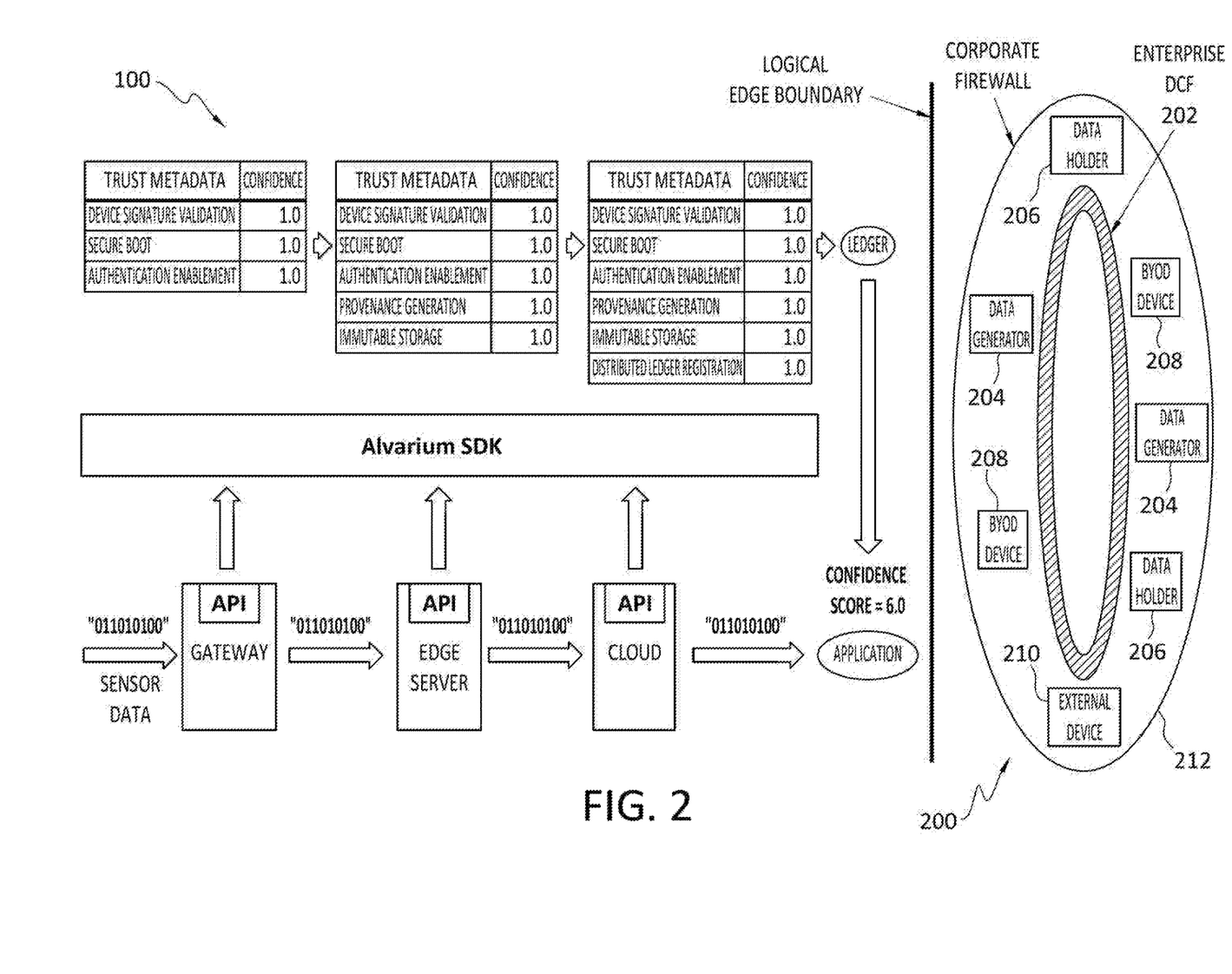
FIG. 2 discloses aspects of an example of extension of DCF structure and functions into an enterprise context.

With these considerations in view, attention is directed to the example of FIG. 2 which discloses an extension of a DCF solution into an enterprise 200. The resulting enterprise DCF 202 may allow for implementation of the annotation and scoring functionality employed in an edge use case, such as the edge use case disclosed herein. Such implementation in an enterprise context may constitute an improvement in enterprise operations as current methods of automating data collection in an enterprise context do not have the ability to generate data confidence in an automated fashion and are not particularly reliable.

In general, FIG. 2 discloses a DCF 202 providing an enterprise "source-of-truth" data confidence fabric within an enterprise 200. Similar to the edge environment use case disclosed herein (see reference 100 in FIG. 1, and included in FIG. 2), this DCF 200 implemented within the enterprise 200 may support annotation of data with trust metadata, such as confidence scores for example. As shown in the example of FIG. 2, the enterprise 200 may comprise a variety of different types of data generators 204, data holders 206, BYOD devices 208, and external devices 210. Some of these devices may be viewed as being relatively more trustworthy than other others. For example, a BYOD brought inside a firewall 212 by corporate employees, contractors, or visitors may be considered as relatively less trustworthy, for various reasons, than a data generator 204 controlled by the enterprise 200. In view of these contextual considerations, and other considerations, various challenges can arise when attempting to construct and implement an enterprise DCF 202.

For example, it may be the case that not all data generators 204 or data holders 206, for example, are trusted corporate assets. In particular, as an organization automates the collection and attestation of the source of data, it may be important to the enterprise to avoid accepting or handling data from sources that are not trusted sources. To illustrate, a company such as DellEMC, for example, may only want end users to contribute data that was generated on an IT-provisioned laptop, while data from an external device, such as a device not provisioned by DellEMC, may not be trusted to provide un-manipulated data.

Another challenge that may arise in an attempt to extend DCF functionality and structure into an enterprise context concerns incorporation of a trusted device into the DCF. Particularly, instantiation of a trusted device method, that is, a method for adding trusted devices to the DCF, may not be enterprise-ready unless the associated behaviors for adding devices enabled by the DCF are automated and essentially touch-free. As well, compliance with data registration requirements of the enterprise must be automated in order to ensure business-access to data. A concern related to this considerations is that manual addition of metadata concerning a device and/or its data is impractical. That is, when registering data and/or data changes with the DCF, it may not be acceptable, or practical, to require any manual collection of metadata. This includes the metadata related to the actors on the data, who created end-state, file-audit level changes, or other specific business-relevant data available.

Extension of DCF functionality and structure into an enterprise context presents other challenges as well. For example, not all data or data types are of equal value to the enterprise. That is, businesses may have very specific needs. In some cases, business users may be confined to the use of Microsoft file types, and the business may only require, or permit, the .docx, .pptx, and/or other similar files to be added to the DCF, such as in cases where log files are of no relevance. In other cases, a specific data center asset may contain the most relevant data within its .log files.

Still another challenge with extension of DCF functionality and structure into an enterprise context relates to data security. For example, a business may have concerns with data types of high security, where the inclusion or identification of the existence of this data type may be of concern. For this reason, a DCF without the ability to create explicit controls and rules on data registration may lack important functionality.

Another challenge is that enablement of registration for all file types on the DCF may not meet business needs. However, it may be the case that only some data generated by applications is of interest to the business. For example, like the need for file type monitoring, there may be instances where a business has determined that only transactional or file information from a specific application, or set of applications, is of corporate relevance and should be registered on the DCF. In such a case, the enablement of registration for all files of a type may not meet the needs of the business since, for example, the group of file type extensions related to the data may not be restrictive enough to meet the business needs.

A further consideration relating to the addition of DCF functionality to an enterprise context relates to the fact that many enterprises may not be willing, or able, to support yet another service, such as the monitoring services that may be associated with DCF functionality. Thus, extension of DCF functionality into an enterprise context may be faced with both technological, and practical, barriers.

Yet other concerns may relate to unmet needs of the enterprise. For example, as users generate information or consume it, there are times when that data may accidentally be out of compliance with corporate or governance policy. Embodiments of the invention may provide the ability to obtain near real-time understanding of when DCF data is out of compliance, and the source of the non-compliant data, as noted below.

Finally, embodiments of the invention may enable identification of the source(s) of data that are non-compliant with enterprise policies, or otherwise present concerns to the enterprise. Similar to the case of software updates, where there is a need to make sure that the .exe, and/or files, are signed by the vendors and traceable, there is likewise a need to be able to reliably ascertain the source(s) of data that may be needed to make business decisions, and the source(s) of any data that may be easily manipulated, such as photos and videos, for example. As such, embodiments of the invention may provide systems and methods for a traceable source of origin on data that includes location, author, and other available metadata.

C. Further Aspects of Example Embodiments

Figure 3:
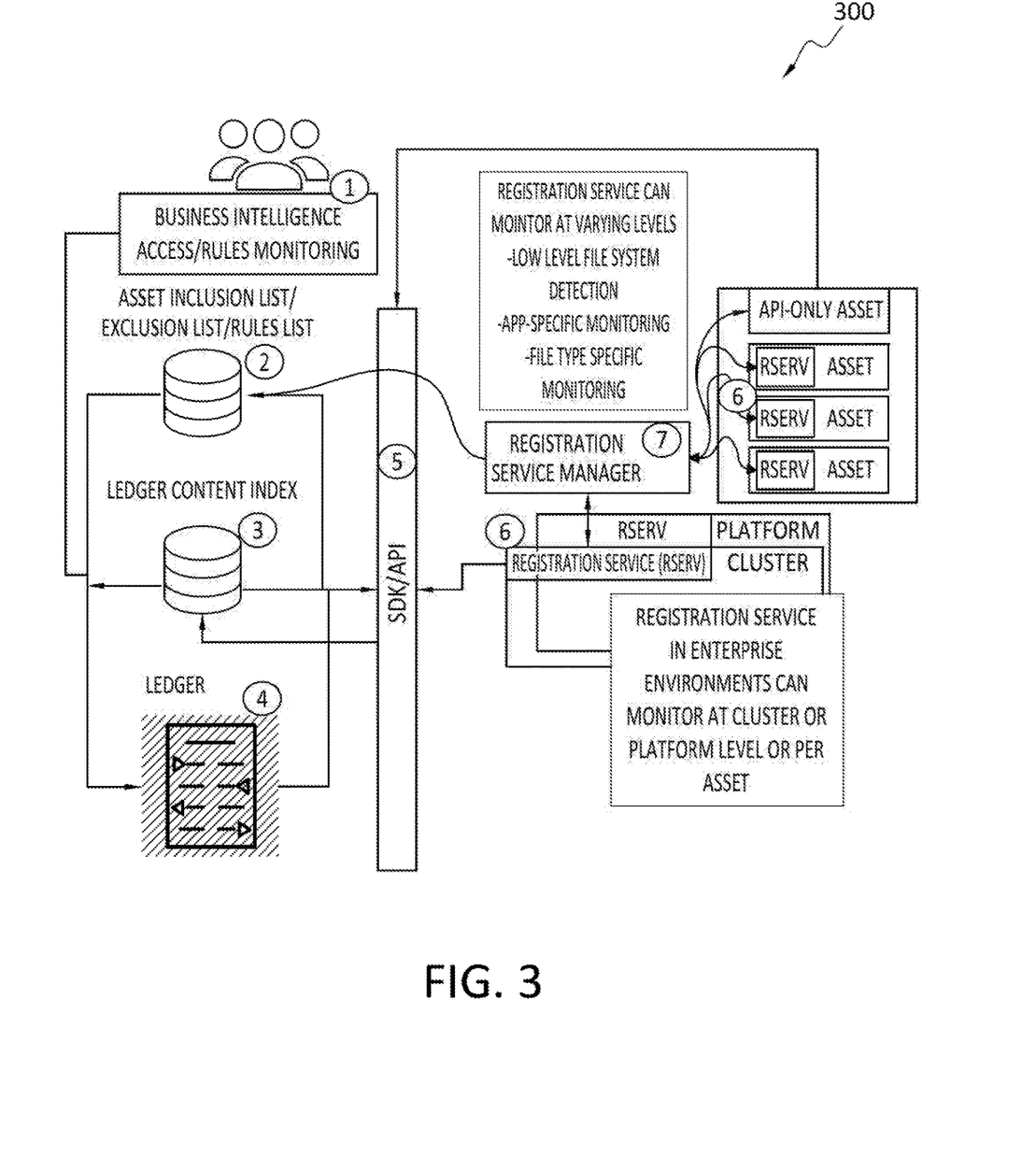
FIG. 3 discloses aspects of implementation of trusted enterprise data assets via a Data Confidence Fabric.

With the foregoing points in view, and directing attention now to FIG. 3, further details are provided concerning some example embodiments of the invention. In general, FIG. 3 discloses configuration 300 in which trusted devices of various types, examples of which are disclosed herein, may be added to an enterprise DCF. Unless otherwise noted, references to a DCF in FIG. 3 are made with respect to an enterprise DCF.

C.1—Adding Trusted Devices to an Enterprise DCF

In terms of their configuration, an enterprise may maintain a number of devices, as well as the software that runs on those devices. The number of devices in an enterprise may be relatively large. As such, the configuration 300 may include business intelligence access and rules monitoring functionality (Area 1 in FIG. 3). Thus, one possible first step, using DCF principles, to implement a more trustworthy enterprise, that is, an enterprise in which devices and associated data may considered as trustworthy, may be to make a provision to "Include" a device, system, asset, and/or software, as a trusted member of the DCF that may be permitted to contribute to the DCF, and to "Exclude" a device, system, asset, and/or software, that is not trusted and whose data may not be permitted to be contributed to the DCF.

Thus, as shown in Area 2 in FIG. 3, an enterprise may include one or more databases other storage devices and/or which may be employed to store, and enable access to, one or more rule sets (Area 2 in FIG. 3) specifying device(s), systems, and/or, software, that are included in the DCF, and devices that are not permitted to access the DCF. That is, the rule set may specify an inclusion list, and an exclusion list. The exclusion list may include, for example, known device types or assets that are associated with, for example, nefarious actors. Enabling the pre-screening of potential DCF assets may help to ensure that assets ultimately permitted to join the DCF provide only trustworthy content for decision making and auditing.

In more detail, and with continued reference to FIG. 3, one example process is briefly summarized as follows. Initially, an IT Administrator, operating with/as the business intelligence access/rules monitor (Area 1) may access the rule set (Area 2 in FIG. 3) to add, change, and/or delete, one or more rules specifying which respective devices, systems, and/or software, are included/excluded in/from the DCF.

Post deployment of software that enables participation by a device in the DCF, a registration service (Area 6) may send an update request, concerning a device that has requested to join the DCF, via a registration service manager (Area 7) which may validate membership of the device, for example, in the DCF by checking a device ID of the device against an inclusion list and/or exclusion list (Area 2). If it is determined that the device is on an inclusion list, or does not appear in an exclusion list, the registration service, in the case of an asset that contains a registration service, or the registration service manager in the case of an asset accessed via API polling, may then create one or more ledger entries (Area 4) via, for example, an SDK (software development kit) or API (application program interface) (Area 5). The ledger entry may indicate, for example, that data generated by the device may be permitted to be contributed to the DCF, and the ledger entry may also include an identifier that uniquely identifies the device. The content of the ledger may be indexed (area 3) for monitoring such as by an administrator (Area 1), which may be performed on a continual and/or ad hoc basis, so that the administrator/DCF may maintain an ongoing and up to date awareness of which devices, and their respective data, are permitted to participate in the DCF.

With continued reference to the example of FIG. 3, it is noted that there may be multiple instances of a registration service (Area 6). In particular, a registration service may be implemented at various levels such as, but not limited to, a platform level, which may include one or more clusters of one or more assets or devices, and/or more granularly, at the cluster level or at an individual asset level, one example of which is a device or application. The registration service may thus be configured, and operate, based upon the nature of the asset that requests to be added to the DCF.

C.2—Enabling/Installing "DCF Join" Capabilities on a Trusted Device

With continued reference to the example of FIG. 3, details are now provided concerning the enablement and installation of 'DCF Join' capabilities on a device, for example, that has been determined to be trustworthy, whether by virtue of its inclusion on an inclusion list, or by virtue of its absence from an exclusion list.

In either case, once the device has been determined to be trustworthy, such that it may be permitted to contribute data to the DCF, that device may need to have the ability to identify and communicate with the DCF API/SDKs of choice. Particularly, the device may perform a trusted pairing with the DCF so that registration of the device data with the DCF may be automated thereafter. Note that some embodiments may enable a device to participate in multiple enterprise DCFs.

With particular reference again to FIG. 3, following is a discussion of an example version of a 'DCF join' process. Initially, the IT Administrator (Area 1) may set the DCF membership type on any of a variety of bases, for example, by asset, asset type, or user, and the membership may include information such as DCF contact data (Area 2) for the asset, user, or other entity, that seeks to join the DCF. The DCF contact data may be stored in the ledger, for example.

Post deployment of software that enables participation by the asset in the DCF, the registration service (Area 6) may send an update request, such as by way of the registration service manager (Area 7), using the specified DCF locations and create ledger entries (Area 4) via the SDK or API (Area 5). A ledger entry may include, for example, a device ID and/or any other information concerning the device that has joined the DCF. As well, a ledger entry may indicate an operation that a device, which has been permitted to join the DCF, performs with respect to data, such as a data generation operation, or data modification operation, for example. Thus, a ledger entry may identify (i) a device, (ii) an operation performed by that device, (iii) the data with respect to which the operation was performed, and (iv) the result of performance of the operation. The content of the ledger may be indexed (Area 3) for monitoring.

Note that after deployment of the software that enables its participation in the DCF, a device may not be capable of tracking its data operations and storing results of those data operations in a DCF ledger. That is, while the device may be capable of performing data operations, such as modifying a file for example, the device may not be capable of generating DCF metadata about those data operations. The inability of a device, that has joined the DCF, to generate DCF metadata may be imposed by the DCF as a pre-condition to the joining of the DCF by the device. A useful aspect of this approach is that there creation of DCF metadata may be performed only by a single entity, namely, the DCF, and in this way, DCF metadata creation may be more easily controlled and monitored than if the device, or a group of devices, were generating its/their own DCF metadata. As discussed below, the DCF may be automatically notified when a device performs an operation that involves the data of a device and, based on such notification, the DCF may generate new and/or modified metadata corresponding to that operation.

As used herein, DCF metadata is intended to be broad in scope. Such DCD metadata may include, but is not limited to, filenames, dates and times of data creation/modification/deletion, identity of the source of new/modified data, identity of the application that created the new/modified data, and the identity of the owner of the data.

C.3—File System Action as Trigger for End-State Communication

With continued reference to the example of FIG. 3, trusted device services on end points of the DCF (Area 6) may automatically register new, changed, and/or deleted data/metadata, with the DCF (Area 5). For example, a device may perform an operation on a file in a filesystem, and performance of that operation may automatically trigger an update, such as to a ledger entry for example. In this way, the DCF may be made aware, automatically, of any changes with respect to data that involve a device that has been permitted to contribute data/metadata to the DCF. Upon becoming aware of a change involving device data, the DCF may generate metadata corresponding to the operation that caused the change, and/or metadata corresponding to the new/modified/deleted data.

Note that while each asset type may have a device or group-level service model best practice, some standard models may be employed to monitor device data operations and/or trigger a DCF update, such as a ledger update for example, in response to performance of device data operations. Examples of such standard models may include, but are not limited to, the utilization of filesystem services such as CRUD-based triggering (Create/Read/Update/Delete operations), platform-based cluster service monitoring functionality such as Kubernetes cluster monitoring for example, and API-based polling access of a device, such as may be obtained way of a photonic sensor API for example.

C.4—Enablement of File-Type Triggers

In some embodiments, a DCF update, such as to DCF metadata for example, may be automatically performed, or not performed, based upon one or more specific file types with which that DCF metadata is associated. In some instances, enterprise data that is of particular value may be of a specific set of one or more known file types, and the particular file type may be indicated by a file extension such as, for example, .docx, .txt, .stp, .mpeg, or .xls. Conversely, known data of transient value to the enterprise, or of no value to the enterprise, may be of a known file type. In either case however, the relative value of the data may be indicated by a file type that is associated with the data. By generating and storing business rules by file type (Area 1 into Area 2), where the file types may be associated with ABAC (attribute based access control) or other device-based correlation system, the registration service manager (Area 7) and end point registration services (area 7) may complete a DCF update (Area 5 to Area 4) of DCF metadata corresponding to only specified, or non-specified, file types.

C.5—Application-Specific Monitoring

In some scenarios, an enterprise may use specific applications in the performance of business-important activities. In cases like these, DCF registration may be built directly into the application. Additionally, or alternatively, a service may be provided that may serve to monitor for the occurrence of triggering activities or events performed, or caused, by an application, whether the application resides on an authorized DCF device, or elsewhere. This approach may enable remote data generation for cases where simply adding an asset to an inclusion list may be inadequate such as, for example, a BYOD (bring your own device) scenario where a user brings his or her own device into a DCF, such as a laptop, rather than using a device authorized/provisioned by the DCF owner. As another example scenario, a service employ may use a web-based application from home, and remote data generation by that web-based application may be monitored, and DCF metadata generated, for operations performed by the web-based application.

C.6—Backup Services Triggering Entries

At least some backup practices may operate to automatically detect, and protect, any changes to one or more files. In such cases, registration of such operations, and associated metadata, in a ledger may be performed automatically in response to communications from the backup service indicating that such operations have been performed. With reference to the example of FIG. 3, the aforementioned approach may avoid the need for monitoring, such as performed by the registration service at Area 6 of FIG. 3, for data related operations, since the backup application may automatically report such operations to the DCF.

C.7—Risk Visibility

The inclusion, in some embodiments, of an indexing service (Area 3) on the DCF may enable the enterprise to set up rules (Area 1 to Area 2) that are configured, when executed, to look for specific information. For example, in some cases, the enterprise may have a need to generate a data set from a set of known metadata values, such as may be stored in a ledger. By indexing the registered data/metadata in the ledger, the enterprise may create, on-demand, data sets, without interrupting provision of the data set to an end user by requiring registration of the end user with the DCF.

In some cases, the enterprise may have a need to audit data to identify the presence of any governance-regulated data or content, or compliance with location and/or content-based rules. By indexing the content in a ledger, while also providing attestation as to the source of the content, the enterprise may be able to detect, in the content, any deviations from the rules, or guidelines concerning governance-regulated data. In some embodiments, attestation as to the source of the content may specifically identify the source topography, that is, the particular physical assets, and their respective configurations, involved in the generation of the content. Finally, some embodiments may be able to identify original content generated by an authorized source, and thus detect manipulation if such content should appear from a secondary source, such as another source in the DCF or a source that has not been permitted to join the DCF. Such detection may be performed, for example, by a comparison of the respective metadata associated with the original content and with the content from the secondary source. The metadata associated with the original content may be stored in a ledger, while metadata associated with the content from the secondary source may or may not be stored in the ledger. As such, a potential risk associated with the content from the secondary source may be visible to a system administrator and/or other entities.

C.8—Attestation

In some embodiments, the ledger (Area 4) may include topographical and data source data/metadata for a data source that generates data that is permitted to be added to the DCF. The topographical information may include, for example, information concerning the physical asset(s), and their respective configurations, that make up the data source. Using the information in the ledger, and an indexing process (Area 3), some embodiments of the invention may be able to identify the first occurrence, in the DCF, of particular data, and any deviations or differences, between that data and data introduced by a secondary source, or other source.

D. Aspects of an Example Use Case and Method

Figure 4:
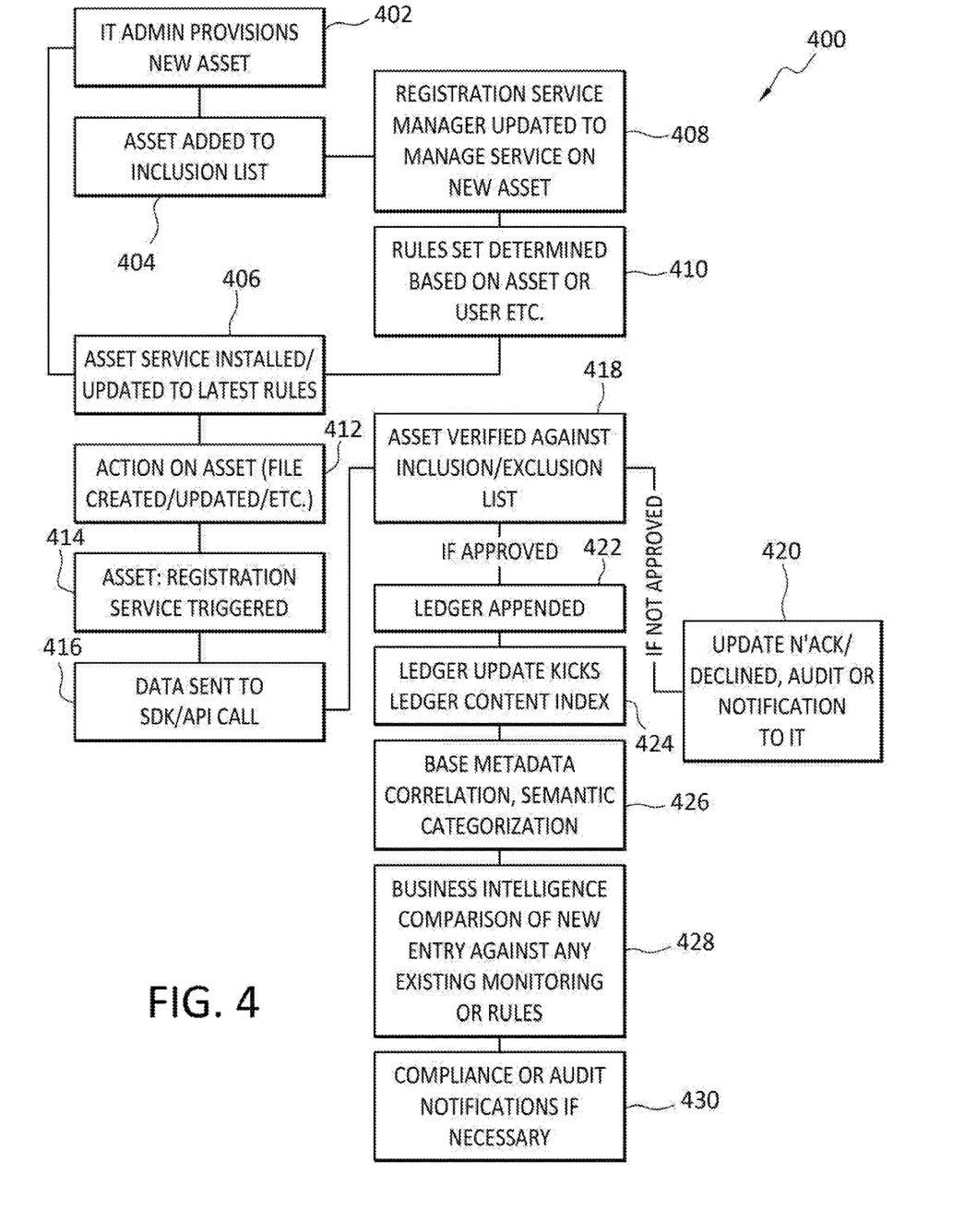
FIG. 4 is a flowchart for an enterprise 'Inclusion' list use case

With attention now to FIG. 4, details are provided concerning one example use case. In general, many enterprises do not have a good handle on all data, whether such data is generated/located in an edge environment, or central environment such as a datacenter, and the cost of data set generation, such as in response to a user request for example, may be relatively high both in terms of the time and processing resources that may be required to generate the data set.

As well, enterprise and/or other entity governance may require audit/historical traceability of data content and the location of the data. A related problem is that IT departments may be unwillingly and unknowingly non-compliant with data handling mandates. As such, enterprise data may be at risk of manipulation, with little possibility that such manipulation, such as changes to the data, will be detected. In light of this, embodiments of the invention may enable creation of on-demand data sets without requiring end user registration, such as via access to the index and composition from query results returned. As well, some embodiments may enable audits, which may be location and/or content-based, to ensure governance compliance. Particularly, such embodiments may identify indexed ledger data that triggers a rule set that was created by the IT department (Area 1 in FIG. 3). One example illustrative workflow is disclosed in FIG. 4.

It is noted with respect to the example method of FIG. 4 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

In FIG. 4, an example method 400 is disclosed for use of an enterprise 'Inclusion' list, and related processes. The method 400, which may be performed at/by a DCF, may begin with the provisioning 402 of a new enterprise asset, examples of which are disclosed in FIG. 2 and elsewhere herein. After the enterprise asset has been provisioned 402, such as by an enterprise IT department, the asset may be added 404 to an 'Inclusion' list which lists those assets that are permitted to add data to a DCF of the enterprise.

At some point after the asset has been added 404 to the 'Inclusion' list, an asset registration service on the asset may be installed, or updated, as applicable, to reflect a latest version of one or more rules 406 generated by an entity such as the IT department. The rules may concern registration, such as in a ledger for example, of data generated by the asset. Correspondingly, an entity such as a registration service manager may be updated 408 to manage the registration service installed/updated 406 on the new asset. At 410, an applicable rule set for the asset may be determined based on various information, which may or may not be asset-specific. Such information may include, but is not limited to, a device ID, or a user associated with that asset. At this point in the method 400, the asset may be ready to begin performing data operations, such as CRUD operations for example.

Accordingly, the method 400 may proceed to 412 where the asset performs an action or operation on a dataset, such as a file for example. More particularly, an application at the asset may perform the file operation. In response to performance of the operation 412, an asset registration service may be triggered 414, and the data associated with performance of the operation 412 sent to an SDK/API call 416.

The asset that performed the operation 412 may then be submitted for verification 418 as present on an Inclusion List, or not present on an Exclusion List. If the asset is not verified, that is, not approved to submit data to the DCF, then the system may decline 420 to add the asset to the DCF. On the other hand, if the asset is verified, then a ledger may be appended 422 to include the new/modified data that was generated as a result of the operation 412. The addition 422 of the new/modified data to the ledger may cause a ledger content index to be updated 424 to reflect the addition of that data to the ledger.

As well, performance of the operation 412, and/or addition 422 of data to the ledger, may cause the DCF to generate metadata corresponding to the new/modified data resulting from the operation 412. This metadata may be stored by the DCF in the ledger in association with the new/modified data that resulted from the operation 412.

At 426, a baseline metadata correlation process may be performed within the ledger index to determine, for example, if any new data sets need to be created. A business intelligence comparison may also be performed 428 of the new entry against any existing monitoring or rules. For example, if the new data written to the ledger contains a social security number, thereby violating an established rule, an IT department can be notified 430 that there is a violation.

E. Further Example Embodiments

Following are some further example embodiments of the invention. These are presented only by way of example and are not intended to limit the scope of the invention in any way.

Embodiment 1. A method, comprising: checking an asset against an Inclusion List and/or an Exclusion List to determine if the asset is permitted to contribute data, generated by the asset, to an enterprise data confidence fabric; when the asset is present on the Inclusion List, or not present on the Exclusion List, designating the asset as a trusted asset and appending the data generated by the asset to a ledger of the enterprise data confidence fabric; updating a ledger content index to reflect the data that was appended to the ledger; and annotating the data generated by the asset with trust metadata.

Embodiment 2. The method as recited in embodiment 1, wherein additional data generated or modified by the trusted asset is automatically appended to the ledger as a result of the generation or modification of the additional data.

Embodiment 3. The method as recited in any of embodiments 1-2, wherein the trust metadata is automatically generated by the data confidence fabric and the data is automatically annotated with the trust metadata by the data confidence fabric.

Embodiment 4. The method as recited in any of embodiments 1-3, wherein, after its designation as a trusted asset, an action by the asset automatically triggers the appending of the data to the ledger.

Embodiment 5. The method as recited in any of embodiments 1-4, further comprising, before checking the asset, provisioning the asset and adding the asset to the Inclusion List.

Embodiment 6. The method as recited in embodiment 5, wherein a registration service manager of the data confidence fabric is updated to manage a service on the asset.

Embodiment 7. The method as recited in embodiment 5, further comprising enabling a 'DCF Join' capability on the asset.

Embodiment 8. The method as recited in embodiment 7, wherein the 'DCF Join' capability is built-in to an application that runs on the asset.

Embodiment 9. The method as recited in any of embodiments 1-8, further comprising generating a data set based on information in the ledger index.

Embodiment 10. The method as recited in any of embodiments 1-9, wherein appending the data generated by the asset to a ledger of the enterprise data confidence fabric is performed according to a rule.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
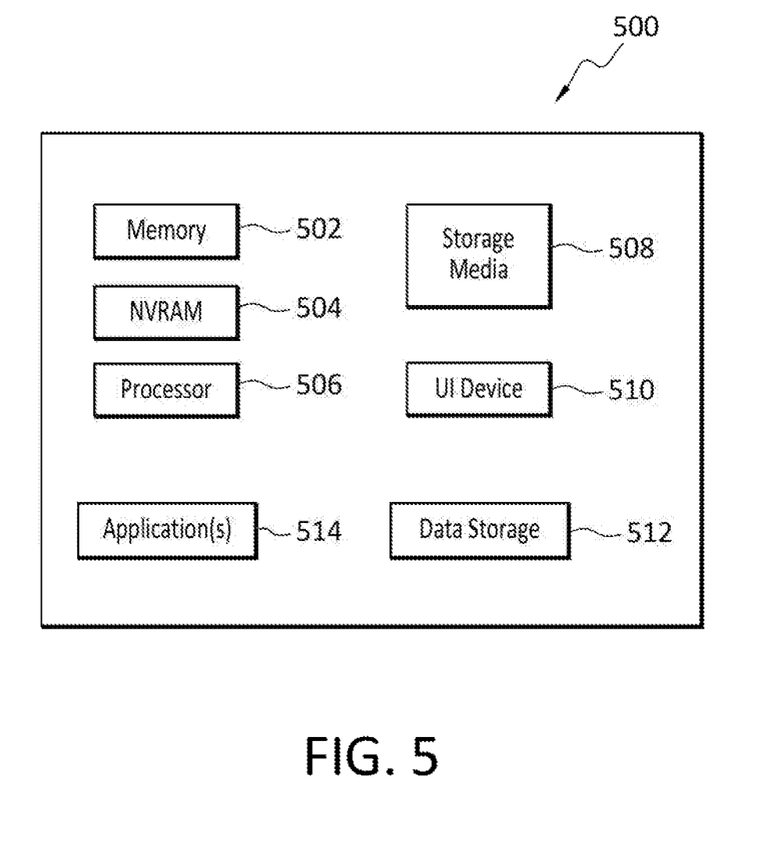
FIG. 5 discloses aspects of an example computing entity.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    checking an asset against an Inclusion List and/or an Exclusion List to determine if the asset is permitted to contribute data, generated by the asset, to an enterprise data confidence fabric;
    when the asset is present on the Inclusion List, or not present on the Exclusion List, designating the asset as a trusted asset and appending the data generated by the asset to a ledger of the enterprise data confidence fabric;
    updating a ledger content index to reflect the data that was appended to the ledger; and
    annotating the data generated by the asset with trust metadata.

2. The method as recited in claim 1, wherein additional data generated or modified by the trusted asset is automatically appended to the ledger as a result of the generation or modification of the additional data.

3. The method as recited in claim 1, wherein the trust metadata is automatically generated by the data confidence fabric and the data is automatically annotated with the trust metadata by the data confidence fabric.

4. The method as recited in claim 1, wherein, after its designation as a trusted asset, an action by the asset automatically triggers the appending of the data to the ledger.

5. The method as recited in claim 1, further comprising, before checking the asset, provisioning the asset and adding the asset to the Inclusion List.

6. The method as recited in claim 5, wherein a registration service manager of the data confidence fabric is updated to manage a service on the asset.

7. The method as recited in claim 5, further comprising enabling a 'DCF Join' capability on the asset.

8. The method as recited in claim 7, wherein the 'DCF Join' capability is built-in to an application that runs on the asset.

9. The method as recited in claim 1, further comprising generating a data set based on information in the ledger index.

10. The method as recited in claim 1, wherein appending the data generated by the asset to a ledger of the enterprise data confidence fabric is performed according to a rule.

11. A non-transitory storage medium having stored therein instructions that are executable by one or more hardware processors to perform operations comprising:
    checking an asset against an Inclusion List and/or an Exclusion List to determine if the asset is permitted to contribute data, generated by the asset, to an enterprise data confidence fabric;
    when the asset is present on the Inclusion List, or not present on the Exclusion List, designating the asset as a trusted asset and appending the data generated by the asset to a ledger of the enterprise data confidence fabric;
    updating a ledger content index to reflect the data that was appended to the ledger; and
    annotating the data generated by the asset with trust metadata.

12. The non-transitory storage medium as recited in claim 11, wherein additional data generated or modified by the trusted asset is automatically appended to the ledger as a result of the generation or modification of the additional data.

13. The non-transitory storage medium as recited in claim 11, wherein the trust metadata is automatically generated by the data confidence fabric and the data is automatically annotated with the trust metadata by the data confidence fabric.

14. The non-transitory storage medium as recited in claim 11, wherein, after its designation as a trusted asset, an action by the asset automatically triggers the appending of the data to the ledger.

15. The non-transitory storage medium as recited in claim 11, wherein the operations further comprise, before checking the asset, provisioning the asset and adding the asset to the Inclusion List.

16. The non-transitory storage medium as recited in claim 15, wherein a registration service manager of the data confidence fabric is updated to manage a service on the asset.

17. The non-transitory storage medium as recited in claim 15, wherein the operations further comprise enabling a 'DCF Join' capability on the asset.

18. The non-transitory storage medium as recited in claim 17, wherein the 'DCF Join' capability is built-in to an application that runs on the asset.

19. The non-transitory storage medium as recited in claim 11, wherein the operations further comprise generating a data set based on information in the ledger index.

20. The non-transitory storage medium as recited in claim 11, wherein appending the data generated by the asset to a ledger of the enterprise data confidence fabric is performed according to a rule.

* * * * *